United States Patent
Iwata et al.

(10) Patent No.: US 11,434,361 B2
(45) Date of Patent: Sep. 6, 2022

(54) EPOXY RESIN COMPOSITION FOR FIBER-REINFORCED COMPOSITE MATERIAL, PREPREG AND FIBER-REINFORCED COMPOSITE MATERIAL

(71) Applicant: The Yokohama Rubber Co., LTD., Tokyo (JP)

(72) Inventors: Mitsuhiro Iwata, Hiratsuka (JP); Tomohiro Ito, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 111 days.

(21) Appl. No.: 16/768,050

(22) PCT Filed: Nov. 26, 2018

(86) PCT No.: PCT/JP2018/043377
§ 371 (c)(1),
(2) Date: May 28, 2020

(87) PCT Pub. No.: WO2019/107307
PCT Pub. Date: Jun. 6, 2019

(65) Prior Publication Data
US 2020/0362162 A1 Nov. 19, 2020

(30) Foreign Application Priority Data
Nov. 28, 2017 (JP) .............................. JP2017-228347

(51) Int. Cl.
C08L 61/30 (2006.01)
C08J 5/24 (2006.01)
C08L 63/00 (2006.01)

(52) U.S. Cl.
CPC ............... *C08L 63/00* (2013.01); *C08J 5/24* (2013.01); *C08J 2363/00* (2013.01); *C08J 2409/00* (2013.01); *C08J 2463/00* (2013.01); *C08J 2481/06* (2013.01)

(58) Field of Classification Search
CPC ......... C08L 63/00; C08J 5/24; C08J 2363/00; C08J 2409/00; C08J 2463/00; C08J 2481/06
USPC ....................................................... 523/201
See application file for complete search history.

(56) References Cited

U.S. PATENT DOCUMENTS

| 6,045,898 | A | 4/2000 | Kishi et al. |
| 2012/0231687 | A1 | 9/2012 | Miura et al. |
| 2016/0176083 | A1* | 6/2016 | Meegan .............. B29C 45/0001 523/467 |
| 2016/0244590 | A1 | 8/2016 | Takada |

FOREIGN PATENT DOCUMENTS

| JP | S61-239068 | 10/1986 |
| JP | H06-025445 | 2/1994 |
| JP | H11-043534 | 2/1999 |
| JP | H11-043546 | 2/1999 |
| JP | 3648743 | 5/2005 |
| JP | 2006-291092 | 10/2006 |
| JP | 2009-242459 | 10/2009 |
| JP | 2011-190430 | 9/2011 |
| JP | 2012-149237 | 8/2012 |
| JP | 2013-155330 | 8/2013 |
| JP | 2017-149887 | 8/2017 |
| TW | 201118110 | 6/2011 |
| TW | 201522490 | 6/2015 |
| WO | WO 97/28210 | 8/1997 |
| WO | WO 2011/040602 | 4/2011 |
| WO | WO 2015/068786 | 5/2015 |

OTHER PUBLICATIONS

Huntsman, "Araldite MY 721 Resin", Jun. 2015 (Year: 2015).*
Hexion, "Epon Resin 828", Jun. 21, 2021 (Year: 2021).*
European Search Report for European Application No. 18884207.4 dated Jul. 27, 2021, 6 pages, Germany.
International Search Report for International Application No. PCT/JP2018/043377 dated Jan. 29, 2019, 3 pages, Japan.

* cited by examiner

*Primary Examiner* — David T Karst
(74) *Attorney, Agent, or Firm* — Thorpe North & Western

(57) ABSTRACT

In an epoxy resin composition, per 100 parts by mass of an epoxy resin component containing from 60 to 85 parts by mass of N,N,N',N'-tetraglycidyldiaminodiphenylmethane resin (A) having a viscosity at 50° C. of 6000 mPa·s or less and from 15 to 40 parts by mass of a liquid bisphenol A epoxy resin (B) having a viscosity at 25° C. of 20000 mPa·s or less, from 8 to 15 parts by mass of a thermoplastic resin (C), from 2 to 10 parts by mass of elastomer microparticles (D) having an average particle diameter of 1000 nm or less, and from 0.5 to 2.5 parts by mass of silica microparticles (E) having an average particle diameter of 1000 nm or less are blended.

12 Claims, No Drawings

EPOXY RESIN COMPOSITION FOR FIBER-REINFORCED COMPOSITE MATERIAL, PREPREG AND FIBER-REINFORCED COMPOSITE MATERIAL

TECHNICAL FIELD

The present technology relates to an epoxy resin composition for a fiber-reinforced composite material, a prepreg and a fiber-reinforced composite material.

BACKGROUND ART

In the related art, epoxy resins have been the mainstream of matrix resins for carbon fiber- and glass fiber-reinforced composite materials applied to aircraft, for example, and have been used in many fuselage structures. For example, Japan Unexamined Patent Publication No. 2009-242459 describes a resin composition containing, as essential components, [A] 100 parts by mass of an epoxy resin, [B] from 5 to 80 parts by mass of a thermoplastic resin, [C] from 20 to 50 parts by mass of diaminodiphenyl sulfone, and [D] from 0.01 to 30 parts by mass of inorganic microparticles having an average particle diameter of 1 to 1000 nm. Japan Patent No. 3648743 describes a resin composition for a fiber-reinforced composite material containing [A] an epoxy resin, [B] a curing agent, and [C] an additive, [C] containing inorganic substance formed from primary particles having an average diameter of 40 nm or less, the resin composition for a fiber-reinforced composite material having a particular storage shear modulus.

However, the epoxy resin compositions for fiber-reinforced composite materials in the related art described above have a problem in that both heat resistance and toughness cannot be simultaneously achieved, and a problem in that a desired durability cannot be satisfied as a component to be used under harsh conditions, such as that for aircraft. Note that, it is generally known that use of a resin that imparts high heat resistance results in decrease in toughness, and therefore these properties are in antinomy.

Meanwhile, for the resin composition during prepreg formation, there are viscosity characteristics each suitable during impregnation and suitable during curing. For example, it is required to exhibit excellent workability (impregnation capability) by allowing the viscosity to decrease at low temperature conditions (temperature and time to the extent that does not degrade thermal history of the resin) during impregnation, and to exhibit resin flowability by which the resin does not excessively flow out from reinforcing fibers during curing and the resin flows to the extent that space is filled during lamination. However, the epoxy resin compositions for fiber-reinforced composite materials in the related art have been incapable of adequately satisfying these viscosity characteristics.

SUMMARY

The present technology provides an epoxy resin composition for a fiber-reinforced composite material that has excellent heat resistance and toughness, exhibits excellent workability by allowing the viscosity to decrease at low temperature conditions (temperature and time to the extent that does not degrade thermal history of the resin) during impregnation, and exhibits resin flowability by which the resin does not excessively flow out from reinforcing fibers during curing and the resin flows to the extent that space is filled during lamination.

Furthermore, the present technology provides a prepreg having excellent heat resistance and toughness as well as excellent workability at room temperature.

Furthermore, the present technology provides a fiber-reinforced composite material that has excellent heat resistance and toughness and that can be applied to various applications.

As a result of diligent research, the present inventors found improvements by employing two types of epoxy resin components having particular physical properties and by blending particular amounts of a thermoplastic resin, and elastomer microparticles and silica microparticles having particular particle diameters.

The present technology is described below.

1. An epoxy resin composition for a fiber-reinforced composite material containing:
per 100 parts by mass of an epoxy resin component containing from 60 to 85 parts by mass of N,N,N',N'-tetraglycidyldiaminodiphenylmethane resin (A) having a viscosity at 50° C. of 6000 mPa·s or less and from 15 to 40 parts by mass of a liquid bisphenol A epoxy resin (B) having a viscosity at 25° C. of 20000 mPa·s or less,
from 8 to 15 parts by mass of a thermoplastic resin (C),
from 2 to 10 parts by mass of elastomer microparticles (D) having an average particle diameter of 1000 nm or less, and
from 0.5 to 2.5 parts by mass of silica microparticles (E) having an average particle diameter of 1000 nm or less.

2. The epoxy resin composition for a fiber-reinforced composite material according to 1 above, where a viscosity at 70° C. is 200 Pa·s or less, and a minimum viscosity in a curing process is 1 Pa·s or greater.

3. The epoxy resin composition for a fiber-reinforced composite material according to 1 above, where the thermoplastic resin (C) is polyethersulfone.

4. The epoxy resin composition for a fiber-reinforced composite material according to 1 above, where the epoxy resin composition is formed by dissolving the thermoplastic resin (C) in the component (A) and/or the component (B).

5. The epoxy resin composition for a fiber-reinforced composite material according to 1 above, where the elastomer microparticles (D) are core-shell microparticles.

6. The epoxy resin composition for a fiber-reinforced composite material according to 1 above, further containing a curing agent (F), where the curing agent (F) is diaminodiphenyl sulfone.

7. The epoxy resin composition for a fiber-reinforced composite material according to 1 above, where the viscosity at 50° C. of the N,N,N',N'-tetraglycidyldiaminodiphenylmethane resin (A) is from 3000 to 6000 mPa·s.

8. The epoxy resin composition for a fiber-reinforced composite material according to 1 above, where the viscosity at 25° C. of the liquid bisphenol A epoxy resin (B) is 18000 mPa·s or less.

9. The epoxy resin composition for a fiber-reinforced composite material according to 1 above, where the average particle diameter of the elastomer microparticles (D) is 500 nm or less.

10. The epoxy resin composition for a fiber-reinforced composite material according to 1 above, where the average particle diameter of the silica microparticles (E) is from 5 to 100 nm.

11. A prepreg formed by using the epoxy resin composition for a fiber-reinforced composite material according to 1 above as a matrix and by impregnating reinforcing fibers with the epoxy resin composition.

12. A fiber-reinforced composite material, the fiber-reinforced composite material being a thermoset product of the prepreg according to 11 above.

The epoxy resin composition for a fiber-reinforced composite material according to an embodiment of the present technology contains N,N,N',N'-tetraglycidyldiaminodiphenylmethane resin (A) having a viscosity at 50° C. of 6000 mPa·s or less, a liquid bisphenol A epoxy resin (B) having a viscosity at 25° C. of 20000 mPa·s or less, a thermoplastic resin (C), elastomer microparticles (D) having an average particle diameter of 1000 nm or less, and silica microparticles (E) having an average particle diameter of 1000 nm or less, blended in particular ranges. Therefore, the epoxy resin composition for a fiber-reinforced composite material can be provided in which heat resistance and toughness, which have been considered to be in antinomy in the related art, can be enhanced, and which has excellent workability by allowing the viscosity to decrease at low temperature conditions (temperature and time to the extent that does not degrade thermal history of the resin) during impregnation, and exhibits resin flowability by which the resin does not excessively flow out from reinforcing fibers during curing and the resin flows to the extent that space is filled during lamination.

Furthermore, the prepreg according to an embodiment of the present technology is formed by using the epoxy resin composition for a fiber-reinforced composite material described above as a matrix and by impregnating reinforcing fibers with the epoxy resin composition, and thus achieves excellent heat resistance and toughness as well as excellent workability at room temperature.

Furthermore, the fiber-reinforced composite material according to an embodiment of the present technology is a thermoset product of the prepreg described above, and thus achieves excellent heat resistance and toughness and can be employed in various applications.

DETAILED DESCRIPTION

The present technology will be described in further detail below.

The epoxy resin composition for a fiber-reinforced composite material according to an embodiment of the present technology contains N,N,N',N'-tetraglycidyldiaminodiphenylmethane resin (A), a liquid bisphenol A epoxy resin (B), a thermoplastic resin (C), elastomer microparticles (D), and silica microparticles (E). Each component is described in detail below.

N,N,N',N'-tetraglycidyldiaminodiphenylmethane Resin (A)

The N,N,N',N'-tetraglycidyldiaminodiphenylmethane resin (A) used in an embodiment of the present technology (hereinafter, also referred to as the component (A)) needs to have a viscosity at 50° C. of 6000 mPa·s or less. When the viscosity at 50° C. of the component (A) is greater than 6000 mPa·s, heat resistance, toughness, and the viscosity characteristics cannot be satisfied at the same time. The viscosity at 50° C. of the component (A) is preferably from 3000 to 6000 mPa·s. Note that the viscosity according to an embodiment of the present technology is a value measured by using a rotational viscometer, such as E type viscometer, under a predetermined temperature condition.

The component (A) can be appropriately selected from commercially available products having the range of viscosity described above. Examples thereof include YH-404 (viscosity at 50° C.=3600 to 5000 mPa·s) available from NIPPON STEEL Chemical & Material Co., Ltd., MY-721 (viscosity at 50° C.=3000 to 6000 mPa·s) available from Huntsman International LLC, and trade name "SKE-3" (viscosity at 50° C.=3500 to 5500 mPa·s) available from Changzhou Sunchem High Performance Polymer Co., Ltd.

Liquid Bisphenol A Epoxy Resin (B)

The liquid bisphenol A epoxy resin (B) used in an embodiment of the present technology (hereinafter, also referred to as the component (B)) needs to have a viscosity at 25° C. of 20000 mPa·s or less. When the viscosity at 25° C. of the component (B) is greater than 20000 mPa·s, heat resistance, toughness, and the viscosity characteristics cannot be satisfied at the same time. The viscosity at 25° C. of the component (B) is preferably 18000 mPa·s or less, and more preferably 16000 mPa·s or less.

The component (B) can be appropriately selected from commercially available products having the range of viscosity described above. Examples thereof include YD-128 (viscosity at 25° C.=11000 to 15000 mPa·s) available from NIPPON STEEL Chemical & Material Co., Ltd., trade name "YD-127" (viscosity at 25° C.=8000 to 15000 mPa·s) available from NIPPON STEEL Chemical & Material Co., Ltd., and trade name "jER 828" (viscosity at 25° C.=12000 to 15000 mPa·s) available from Mitsubishi Chemical Corporation.

Thermoplastic Resin (C)

Examples of the thermoplastic resin (C) used in an embodiment of the present technology (hereinafter, also referred to as the component (C)) include polyethersulfone (PES), polyimide, polyetherimide (PEI), polyamide-imide, polysulfone, polycarbonate, polyether ether ketone, polyamides, such as nylon 6, nylon 12, and amorphous nylon, aramid, arylate, polyester carbonate, and phenoxy resins. Among these, from the perspective of further enhancing heat resistance, toughness, and the viscosity characteristics described above, polyethersulfone (PES) is preferred.

Elastomer Microparticles (D)

The elastomer microparticles (D) used in an embodiment of the present technology (hereinafter, also referred to as the component (D)) need to have an average particle diameter of 1000 nm or less. When the average particle diameter of the component (D) is greater than 1000 nm, heat resistance, toughness, and the viscosity characteristics cannot be satisfied at the same time. The average particle diameter of the component (D) is preferably 500 nm or less, and more preferably 300 nm or less. Note that the average particle diameter in an embodiment of the present technology means the average value of the equivalent circle diameter measured using, for example, an electron microscope or a laser microscope. For example, the average particle diameter can be measured by the laser diffraction scattering particle size distribution analyzer LA-300 (available from Horiba, Ltd.) or the laser microscope VK-8710 (available from Keyence Corporation).

The component (D) is preferably known core-shell microparticles and, for example, can be particles in which a surface of particulate core component containing a cross-linked rubber polymer as a main component is subjected to graft polymerization with a shell component polymer that is different from the core component.

Examples of the core component include butadiene rubber, acrylic rubber, silicone rubber, butyl rubber, NBR, SBR, IR, and EPR.

Examples of the shell component include polymers obtained by polymerizing monomers selected from acrylic acid ester-based monomers, methacrylic acid ester-based monomers, and/or aromatic vinyl monomers.

The component (D) can be appropriately selected from commercially available products having the average particle diameter described above. Example thereof include MX-154 (epoxy resin/core-shell rubber particle masterbatch; containing 40 mass % of butadiene-based core-shell rubber particles; average particle diameter=100 to 200 nm) available from Kaneka Corporation, and trade name "MX-125" (epoxy resin/core-shell rubber particle masterbatch; containing 25 mass % of SBR-based core-shell rubber particles; average particle diameter=100 to 200 nm) available from Kaneka Corporation.

Silica Microparticles (E)

The silica microparticles (E) used in an embodiment of the present technology (hereinafter, also referred to as the component (E)) need to have an average particle diameter of 1000 nm or less. When the average particle diameter of the component (E) is greater than 1000 nm, heat resistance, toughness, and the viscosity characteristics cannot be satisfied at the same time.

The average particle diameter of the component (E) is preferably from 5 to 100 nm, and more preferably 50 nm or less.

The silica microparticles are preferably hydrophilic silica microparticles, and examples thereof include amorphous synthetic silica, such as precipitated silica, gel-type silica, pyrogenic silica, and molten silica; crystalline synthetic silica; and natural silica.

Forms of the silica microparticles are not particularly limited, and examples thereof include spherical, granular, and irregular forms (microparticles having an irregular or amorphous form). From the perspective of simultaneously achieving heat resistance, toughness, and the viscosity characteristics described above, spherical, granular, and irregular forms are preferred.

The component (E) can be appropriately selected from commercially available products having the average particle diameter described above, and example thereof include CAB-O-SIL M5 (hydrophilic fumed silica) available from Cabot Corporation, and trade name "AEROSIL 200" (average particle diameter: 12 nm) available from Nippon Aerosil Co., Ltd.

Curing Agent (F)

In the epoxy resin composition for a fiber-reinforced composite material according to an embodiment of the present technology, various known curing agents (F) (hereinafter, each also referred to the component (F)) can be used. Examples of the component (F) include amine, acid anhydrides, novolac resins, phenol, mercaptan, Lewis acid amine complexes, onium salts, and imidazole. Among these, from the perspective of enhancing heat resistance, diaminodiphenylsulfones, such as 3,3'-diaminodiphenylsulfone (3,3'-DDS) and 4,4'-diaminodiphenylsulfone (4,4'-DDS), are preferred.

Blending Proportion

The epoxy resin composition for a fiber-reinforced composite material according to an embodiment of the present technology contains:
per 100 parts by mass of an epoxy resin component formed from 60 to 85 parts by mass of the component (A) and from 15 to 40 parts by mass of the component (B),
from 8 to 15 parts by mass of the component (C),
from 2 to 10 parts by mass of the component (D), and
from 0.5 to 2.5 parts by mass of the component (E).

In 100 parts by mass of the epoxy resin component, when the blending proportion of the component (A) is less than 60 parts by mass (the amount of the component (B) is greater than 40 parts by mass), heat resistance is deteriorated, and when the blending proportion is greater than 85 parts by mass (the amount of the compound (B) is less than 15 parts by mass), the cured product becomes brittle.

When the amount of the component (C) is less than 8 parts by mass, toughness is deteriorated, and when the amount of the component (C) is greater than 15 parts by mass, low viscosity cannot be maintained during impregnation and workability is deteriorated.

When the amount of the component (D) is less than 2 parts by mass, toughness is deteriorated, and when the amount of the component (D) is greater than 10 parts by mass, modulus of elasticity is deteriorated.

When the amount of the component (E) is less than 0.5 parts by mass, the effect of the present technology cannot be achieved due to the too small blended amount, and when the amount of the component (E) is greater than 2.5 parts by mass, minimum viscosity is increased in the curing process and workability is deteriorated.

The component (A) enhances heat resistance but makes the cured product brittle, which is problematic. Furthermore, when the blended amount of the component (B) is larger, heat resistance decreases. The component (C) enhances toughness and flowability of the resin; however, when a large amount of the component (C) is blended, viscosity increases and workability is deteriorated. The component (D) enhances toughness; however, when a large amount of the component (D) is blended, modulus of elasticity of the cured product is deteriorated. The component (E) is effective to control flowability of the resin; however, when a large amount of the component (E) is blended, the viscosity (thixotropy) increases and workability is deteriorated.

The epoxy resin composition for a fiber-reinforced composite material according to an embodiment of the present technology can make the most of advantages of the components while negative characteristics of the components are complemented. That is, because the viscosity of the component (A) and the viscosity of the component (B), and the proportions of the component (A) and the component (B) are in the specific ranges described above, brittleness is reduced while the heat resistance is not impaired, and because the blended amount of the components (C), (D), and (E) are set to the specific narrow ranges, the viscosity characteristics are enhanced. By such a blending design, the epoxy resin composition for a fiber-reinforced composite material according to an embodiment of the present technology enhances heat resistance and toughness, which have been considered to be in antinomy in the related art, exhibits excellent workability by maintaining low viscosity during impregnation, and exhibits the resin flowability by which the resin does not excessively flow out from reinforcing fibers during curing and the resin flows to the extent that space is filled during lamination.

The epoxy resin composition for a fiber-reinforced composite material according to an embodiment of the present technology may contain another additive as necessary. Examples of the additive include fillers, solvents, flame retardants, antioxidants, pigments (dyes), plasticizers, UV absorbents, surfactants (including leveling agents), dispersants, dehydrating agents, adhesion-imparting agents, and antistatic agents.

The epoxy resin composition for a fiber-reinforced composite material according to an embodiment of the present technology can be prepared by kneading the components (A) to (E) and other component(s) in any order or at the same time. However, from the perspective of enhancing the effect of the present technology, it is preferable to dissolve the component (C) in the component (A) and/or the component (B), then add other component(s), and perform a kneading process.

In the epoxy resin composition for a fiber-reinforced composite material according to an embodiment of the present technology, the viscosity at 70° C. is 200 Pa·s or less, and the minimum viscosity in the curing process can be 1 Pa·s or greater.

By allowing the viscosity at 70° C. to be 200 Pa·s or less, formation of a uniform resin thin film is facilitated. Furthermore, by allowing the minimum viscosity in the curing process to be 1 Pa·s or greater, flow of the resin composition from the reinforcing fibers can be prevented. Note that the curing process herein refers to a process of, for example, curing a resin composition in a mold by leaving the resin at 180 to 200° C. for approximately 1 to 2 hours.

The viscosity at 70° C. of the epoxy resin composition for a fiber-reinforced composite material according to an embodiment of the present technology is preferably from 50 to 200 Pa·s, and the minimum viscosity in the curing process is preferably from 1 to 10 Pa·s.

The prepreg according to an embodiment of the present technology is formed by using the epoxy resin composition for a fiber-reinforced composite material according to an embodiment of the present technology as a matrix and by impregnating reinforcing fibers, such as glass fibers, quartz fibers, or carbon fibers, with the epoxy resin composition. The form of these reinforcing fibers is not particularly limited, and examples thereof include roving, unidirectionally oriented roving, fabric, nonwoven fabric, knitted fabric, and tulle.

The content of the reinforcing fibers in the prepreg according to an embodiment of the present technology is preferably from 20 to 60 mass % from the perspective of mechanical properties of the resulting fiber-reinforced composite material.

A method of manufacturing the prepreg of the present technology is not particularly limited. Examples thereof include dipping methods using a solvent and hot-melt methods (solvent-free methods).

The fiber-reinforced composite material according to an embodiment of the present technology can be obtained by heat-curing the prepreg.

Use of the fiber-reinforced composite material according to an embodiment of the present technology is not particularly limited. Examples thereof include aircraft parts (e.g. radomes, fairings, flaps, leading edges, floor panels, propellers, and fuselages); two-wheel vehicle parts (e.g. motorcycle frames, cowls, and fenders); automobile parts (e.g. doors, bonnets, tailgates, side fenders, side panels, fenders, energy absorbers, trunk lids, hard tops, side mirror covers, spoilers, diffusers, ski carriers, engine cylinder covers, engine hoods, chassis, air spoilers, and propeller shafts); vehicle exterior plating (e.g. lead car noses, roofs, side panels, doors, truck bed covers, and side skirts); railroad vehicle parts (e.g. luggage racks and seats); aero parts (e.g. side skirts and the like mounted on automobiles and rigid vehicles such as interior design elements, inner panels, outer panels, roofs, and floors of wings on wing trucks); use as housings (e.g. notebook computers and portable phones); medical uses (e.g. X-ray cassettes and table tops); audio product uses (e.g. flat speaker panels and speaker cones); sports goods uses (e.g. golf club heads, face masks, snowboards, surf boards, and protectors); and general industrial uses, such as flat springs, windmill blades, and elevators (compartment panels, doors).

Among these described above, because the fiber-reinforced composite material according to an embodiment of the present technology exhibits excellent heat resistance and toughness, the fiber-reinforced composite material is particularly preferably used in aircraft parts, such as components for secondary structure such as flaps.

EXAMPLE

The present technology will be described in further detail by way of examples and comparative examples, but the present technology is not limited by these examples.

The following materials were used in the examples below.

N,N,N',N'-tetraglycidyldiaminodiphenylmethane Resin (A)

YH-404 (viscosity at 50° C.=3600 to 5000 mPa·s) available from NIPPON STEEL Chemical & Material Co., Ltd.

Liquid Bisphenol A Epoxy Resin (B)

YD-128 (viscosity at 25° C.=10000 to 15000 mPa·s) available from NIPPON STEEL Chemical & Material Co., Ltd.

Thermoplastic Resin (C)

Polyethersulfone (PES5003P, available from Sumitomo Chemical Co., Ltd.)

Elastomer Microparticles (D)

MX-154, available from Kaneka Corporation (epoxy resin/core-shell rubber particle masterbatch; containing 40 mass % of butadiene-based core-shell rubber particles; average particle diameter=100 to 200 nm) Note that, in Table 1 below, the amount of the core-shell rubber particles is shown.

Silica Microparticles (E)

Trade name "AEROSIL 200", available from Nippon Aerosil Co., Ltd. (average particle diameter: 12 nm)

Curing Agent (F)

4,4'-Diaminodiphenylsulfone (SEIKACURE-S, available from Wakayama Seika Kogyo Co., Ltd.)

According to the blending proportions (part by mass) shown in Table 1 below, raw materials were kneaded by using a kneader to prepare various resin compositions.

The following items were evaluated for each of the obtained epoxy resin composition for a fiber-reinforced composite materials.

(1) Viscosity at 70° C. (The case where the viscosity is 200 Pa·s or less is evaluated as being good workability during impregnation of reinforcing fibers)

(2) Minimum viscosity in curing process (The case where the viscosity is 1 Pa·s or greater is evaluated as being capable of preventing excessive flow of the resin composition from the reinforcing fibers in the curing process. The case where the viscosity is 10 Pa·s or less is evaluated as having the resin flowability that allows the resin to flow to the extent that space is filled during lamination)

(3) Glass transition temperature: Determined by thermo-mechanical analysis (TMA) at the rate of temperature increase of 10° C./min (The case where the glass transition temperature is 180° C. or higher is evaluated as being good heat resistance)

(4) Tensile elastic modulus: Determined in accordance with ASTM D638 (The case where the tensile elastic modulus is 8.5 GPa or greater is evaluated as being good tensile elastic modulus)

(5) Tensile elongation: Determined in accordance with ASTM D638 (The case where the tensile elongation is 10000μ or greater is evaluated as being good tensile elongation)

The results are shown in Table 1.

TABLE 1-1

| | Blended components | | Example 1 | Example 2 | Example 3 |
|---|---|---|---|---|---|
| A | N,N,N',N'-tetraglycidyldiaminodiphenylmethane resin | | 70 | 65 | 80 |
| B | Bisphenol A epoxy resin | | 30 | 35 | 20 |
| C | Thermoplastic resin | | 11 | 13 | 15 |
| D | Elastomer microparticles | | 8 | 6 | 3 |
| E | Silica microparticles | | 2.5 | 2.0 | 1.5 |
| F | Curing agent | | 44 | 43 | 46 |
| | Evaluation results | | | | |
| (1) Viscosity at 70° C. | | Pa·s | 125 | 131 | 168 |
| (2) Minimum viscosity in curing process | | Pa·s | 1.1 | 1.4 | 2.0 |
| (3) Glass transition temperature | | °C. | 190 | 187 | 196 |
| (4) Tensile elastic modulus | | GPa | 8.9 | 8.8 | 8.7 |
| (5) Tensile elongation | | μ | 10399 | 10610 | 10923 |

TABLE 1-2

| | Blended components | | Comparative Example 1 | Comparative Example 2 | Comparative Example 3 |
|---|---|---|---|---|---|
| A | N,N,N',N'-tetraglycidyldiaminodiphenylmethane resin | | 100 | 30 | 70 |
| B | Bisphenol A epoxy resin | | | 70 | 30 |
| C | Thermoplastic resin | | 13 | 15 | 13 |
| D | Elastomer microparticles | | 5 | 5 | |
| E | Silica microparticles | | 2.0 | 2.0 | |
| F | Curing agent | | 48 | 36 | 44 |
| | Evaluation results | | | | |
| (1) Viscosity at 70° C. | | Pa·s | 180 | 162 | 102 |
| (2) Minimum viscosity in curing process | | Pa·s | 2.2 | 1.7 | 0.3 |
| (3) Glass transition temperature | | °C. | 202 | 174 | 189 |
| (4) Tensile elastic modulus | | GPa | 9.1 | 8.6 | 8.8 |
| (5) Tensile elongation | | μ | 8834 | 10864 | 98328 |

TABLE 1-3

| | Blended components | Comparative Example 4 | Comparative Example 5 | Comparative Example 6 |
|---|---|---|---|---|
| A | N,N,N',N'-tetraglycidyldiaminodiphenylmethane resin | 70 | 70 | 70 |
| B | Bisphenol A epoxy resin | 30 | 30 | 30 |
| C | Thermoplastic resin | 13 | 13 | 20 |
| D | Elastomer microparticles | 15 | | 5 |

TABLE 1-3-continued

| | Blended components | | Comparative Example 4 | Comparative Example 5 | Comparative Example 6 |
|---|---|---|---|---|---|
| E | Silica microparticles | | | 5.0 | 2.0 |
| F | Curing agent | | 44 | 44 | 44 |
| | | Evaluation results | | | |
| (1) Viscosity at 70° C. | | Pa·s | 172 | 280 | 375 |
| (2) Minimum viscosity in curing process | | Pa·s | 1.1 | 1.7 | 4.2 |
| (3) Glass transition temperature | | °C. | 184 | 194 | 192 |
| (4) Tensile elastic modulus | | GPa | 7.8 | 8.9 | 8.7 |
| (5) Tensile elongation | | μ | 10256 | 10367 | 11034 |

TABLE 1-4

| | Blended components | | Comparative Example 7 | Comparative Example 8 | Comparative Example 9 |
|---|---|---|---|---|---|
| A | N,N,N',N'-tetraglycidyldiaminodiphenylmethane resin | | 70 | 70 | 70 |
| B | Bisphenol A epoxy resin | | 30 | 30 | 30 |
| C | Thermoplastic resin | | 11 | 11 | 11 |
| D | Elastomer microparticles | | 8 | 12 | 8 |
| E | Silica microparticles | | 2.5 | 2.5 | 2.7 |
| F | Curing agent | | 44 | 44 | 44 |
| | | Evaluation results | | | |
| (1) Viscosity at 70° C. | | Pa·s | 320 | 142 | 216 |
| (2) Minimum viscosity in curing process | | Pa·s | 2.2 | 1.3 | 1.8 |
| (3) Glass transition temperature | | °C. | 190 | 187 | 191 |
| (4) Tensile elastic modulus | | GPa | 8.5 | 8.2 | 8.8 |
| (5) Tensile elongation | | μ | 10244 | 10682 | 10405 |

From the results in Table 1, because the epoxy resin composition for a fiber-reinforced composite material of each of Examples according to an embodiment of the present technology contains N,N,N',N'-tetraglycidyl-diaminodiphenylmethane resin (A) having a viscosity at 50° C. of 6000 mPa·s or less, a liquid bisphenol A epoxy resin (B) having a viscosity at 25° C. of 20000 mPa·s or less, a thermoplastic resin (C), elastomer microparticles (D) having an average particle diameter of 1000 nm or less, and silica microparticles (E) having an average particle diameter of 1000 nm or less, blended in particular ranges, heat resistance and toughness, which have been considered to be in antinomy in the related art, were enhanced and also excellent viscosity characteristics were achieved.

On the other hand, Comparative Example 1 resulted in inferior tensile elongation (toughness) compared to those of Examples because the component (B) was not blended.

Comparative Example 2 resulted in inferior heat resistance compared to those of Examples because the blending proportions of the component (A) and the component (B) were not within the range specified in an embodiment of the present technology.

Comparative Example 3 had a low minimum viscosity in the curing process and deterioration in the viscosity characteristics was expected because the component (D) and the component (E) were not blended.

For Comparative Example 4, the tensile elastic modulus was deteriorated because the blended amount of the component (D) was greater than the upper limit specified in an embodiment of the present technology and the component (E) was not blended.

For Comparative Example 5, the viscosity at 70° C. was increased and deterioration in the viscosity characteristics was expected because the component (D) was not blended and the blended amount of the component (E) was greater than the upper limit specified in an embodiment of the present technology.

For Comparative Example 6, the viscosity at 70° C. was increased and deterioration in the viscosity characteristics was expected because the blended amount of the component (C) was greater than the upper limit specified in an embodiment of the present technology.

For Comparative Example 7, the viscosity at 70° C. was increased and deterioration in the viscosity characteristics was expected because the viscosity of the component (A) was greater than the upper limit specified in an embodiment of the present technology. Note that, as the component (A) of Comparative Example 7, trade name "YH-434" (viscosity at 50° C.=8000 to 15000 mPa·s), available from NIPPON STEEL Chemical & Material Co., Ltd., was used.

For Comparative Example 8, the tensile elastic modulus was deteriorated because the blended amount of the component (D) was greater than the upper limit specified in an embodiment of the present technology.

For Comparative Example 9, the viscosity at 70° C. was increased and deterioration in the viscosity characteristics was expected because the blended amount of the component (E) was greater than the upper limit specified in an embodiment of the present technology.

The invention claimed is:

1. An epoxy resin composition for a fiber-reinforced composite material comprising:

per 100 parts by mass of an epoxy resin component containing from 60 to 85 parts by mass of N,N,N',N'-tetraglycidyldiaminodiphenylmethane resin (A) having a viscosity at 50° C. of 6000 mPa·s or less and from 15 to 40 parts by mass of a liquid bisphenol A epoxy resin (B) having a viscosity at 25° C. of 20000 mPa·s or less, from 8 to 15 parts by mass of a thermoplastic resin (C), from 2 to 10 parts by mass of elastomer microparticles (D) having an average particle diameter of 1000 nm or less, and from 0.5 to 2.5 parts by mass of silica microparticles (E) having an average particle diameter of 1000 nm or less;

wherein a viscosity at 70° C. is 200 Pa·s or less and 50 Pa·s or greater.

2. The epoxy resin composition for a fiber-reinforced composite material according to claim 1, wherein a minimum viscosity in a curing process is 1 Pa·s or greater.

3. The epoxy resin composition for a fiber-reinforced composite material according to claim 1, wherein the thermoplastic resin (C) is polyethersulfone.

4. The epoxy resin composition for a fiber-reinforced composite material according to claim 1, wherein the epoxy resin composition is formed by dissolving the thermoplastic resin (C) in the N,N,N',N'-tetraglycidyldiaminodiphenylmethane resin (A) and/or the liquid bisphenol A epoxy resin (B).

5. The epoxy resin composition for a fiber-reinforced composite material according to claim 1, wherein the elastomer microparticles (D) are core-shell microparticles.

6. The epoxy resin composition for a fiber-reinforced composite material according to claim 1, further comprising a curing agent (F), wherein the curing agent (F) is diaminodiphenyl sulfone.

7. The epoxy resin composition for a fiber-reinforced composite material according to claim 1, wherein the viscosity at 50° C. of the N,N,N',N'-tetraglycidyldiaminodiphenylmethane resin (A) is from 3000 to 6000 mPa·s.

8. The epoxy resin composition for a fiber-reinforced composite material according to claim 1, wherein the viscosity at 25° C. of the liquid bisphenol A epoxy resin (B) is 18000 mPa·s or less.

9. The epoxy resin composition for a fiber-reinforced composite material according to claim 1, wherein the average particle diameter of the elastomer microparticles (D) is 500 nm or less.

10. The epoxy resin composition for a fiber-reinforced composite material according to claim 1, wherein the average particle diameter of the silica microparticles (E) is from 5 to 100 nm.

11. A prepreg formed by using the epoxy resin composition for a fiber-reinforced composite material described in claim 1 as a matrix and by impregnating reinforcing fibers with the epoxy resin composition.

12. A fiber-reinforced composite material, the fiber-reinforced composite material being a thermoset product of the prepreg described in claim 11.

* * * * *